(12) United States Patent
Kawahara et al.

(10) Patent No.: US 7,819,765 B2
(45) Date of Patent: Oct. 26, 2010

(54) TENSIONER

(75) Inventors: Kentaro Kawahara, Kawasaki (JP);
Keisuke Azuma, Osaka (JP)

(73) Assignees: Nissan Motor Co., Ltd., Yokohama-shi (JP); Gates Unitta Asia Company, Osaka (JP)

( * ) Notice: Subject to any disclaimer, the term of this patent is extended or adjusted under 35 U.S.C. 154(b) by 404 days.

(21) Appl. No.: 11/797,452

(22) Filed: May 3, 2007

(65) Prior Publication Data

US 2007/0281521 A1 Dec. 6, 2007

(30) Foreign Application Priority Data

May 30, 2006 (JP) .............................. 2006-149476

(51) Int. Cl.
*F16H 7/08* (2006.01)
*F16H 7/12* (2006.01)

(52) U.S. Cl. ..................................... 474/135

(58) Field of Classification Search ................. 474/135, 474/117, 118, 133; *F16H 7/12*
See application file for complete search history.

(56) References Cited

U.S. PATENT DOCUMENTS

| | | | | |
|---|---|---|---|---|
| 4,285,676 | A | * 8/1981 | Kraft | 474/135 |
| 4,872,768 | A | * 10/1989 | Brandenstein et al. | 384/223 |
| 5,030,172 | A | 7/1991 | Green et al. | |
| 5,057,059 | A | * 10/1991 | Sidwell et al. | 474/135 |
| 5,250,009 | A | * 10/1993 | Sidwell et al. | 474/135 |
| 5,348,514 | A | * 9/1994 | Foley | 474/135 |
| 5,620,385 | A | * 4/1997 | Cascionale et al. | 474/112 |
| 5,993,343 | A | * 11/1999 | Rocca et al. | 474/135 |
| 6,001,037 | A | * 12/1999 | Rocca et al. | 474/112 |
| 6,592,482 | B2 | * 7/2003 | Serkh | 474/135 |
| 6,682,452 | B2 | * 1/2004 | Quintus | 474/135 |
| 2002/0037783 | A1 | * 3/2002 | Chambers et al. | 474/135 |
| 2002/0119850 | A1 | 8/2002 | Dutil | |
| 2003/0083164 | A1 | 5/2003 | MacHaughton et al. | |

FOREIGN PATENT DOCUMENTS

| | | | |
|---|---|---|---|
| DE | 10252432 A1 | * | 5/2004 |
| EP | 636815 A1 | * | 2/1995 |
| FR | 2867247 A1 | * | 9/2005 |
| JP | 02021020 A | * | 1/1990 |
| JP | 2006-009923 A | | 1/2006 |

* cited by examiner

*Primary Examiner*—Robert A Siconolfi
*Assistant Examiner*—Stephen Bowes
(74) *Attorney, Agent, or Firm*—Foley & Lardner LLP

(57) ABSTRACT

An arm (3) supporting a tension pulley (2) around which an endless torque transmitting member (B) is looped is supported by a fixed member (E) via a base member (7). A torsion coil spring (8) is interposed between the base member (7) and the arm (3). The base member (7) is brought into pressure-contact with the fixed member (E) by a tightening force of a bolt (6). A pivot shaft (5) is fitted onto the outer circumference of the bolt (6) so as not to cause a tip to contact the fixed member (E). By transmitting an axial force generated by tightening the bolt (6) to the base member (7) via a flange (5A) formed on the outer circumference of the pivot shaft (5), the distribution of a contact pressure between the fixed member (E) and the base member (7) is optimized.

6 Claims, 3 Drawing Sheets

TENSIONER

FIELD OF THE INVENTION

This invention relates to a support structure of a tensioner which exerts a predetermined tensile force on an endless torque transmitting member such as a belt, a chain, and so on.

BACKGROUND OF THE INVENTION

JP2006-009923A, published by the Japan Patent Office in 2006, proposes a tensioner which exerts a tensile force on an endless belt. The tensioner comprises an arm supporting a tension pulley on a tip, a base member which supports the arm to rotate about the base member, and a torsion coil spring exerting a rotational force on the arm with respect to the base member.

The endless belt is looped around the tension pulley. According to the rotational force acting on the arm, the tension pulley pushes the endless belt inward or outward so as to generate a predetermined tensile force on the endless belt.

A bolt penetrating a bolt hole formed in the central portion of the base member is screwed into a fixed member so as to fix the base member to the fixed member.

SUMMARY OF THE INVENTION

An end of the torsion coil spring is supported by the arm and another end thereof is supported by the base member. As a result, the base member always receives a reaction torque in an opposite direction to the rotational torque that the torsion oil spring exerts on the arm.

In the prior art tensioner, this reaction torque is supported by a frictional resistance between the base member and the fixed member. In order to increase the tensile force of the endless belt, therefore, the frictional resistance between the base member and the fixed member must be increased. To increase the frictional resistance between the base member and the fixed member, however, it is necessary to increase a binding force of the bolt fixing the base member to the fixed member.

When the base member is constructed from cast metal obtained through die-casting of an aluminum alloy, an increase in the size of the base member, for example an increase in the wall thickness of the base member, or modification of the shape of the base member may be required to increase the bearing capacity of the friction surface between the base member and the fixed member.

It is therefore an object of this invention to improve the support structure of a reaction torque of a torsion coil spring in a tensioner for an endless torque transmitting member.

In order to achieve the above object, this invention provides a tensioner supported on a fixed member for applying a tensile force to an endless torque transmitting member.

The tensioner comprises a tension pulley engaged with the endless torque transmitting member, an arm supporting the tension pulley, a base member interposed between the arm and the fixed member, a pivot shaft penetrating the arm and inserted into the base member so as to allow the arm to rotate with respect to the base member, a torsion coil spring interposed between the base member and the arm so as to exert a rotational torque on the arm, a bolt penetrating the pivot shaft and screwed into the fixed member, the bolt having a bolt head engaged with a tip of the pivot shaft, and a relative displacement preventing mechanism which prevents a relative displacement between the base member and the pivot shaft when an axial force is transmitted from the bolt to the base member via the pivot shaft.

The details as well as other features and advantages of this invention are set forth in the remainder of the specification and are shown in the accompanying drawings.

DESCRIPTION OF THE PREFERRED EMBODIMENTS

Figure 1:
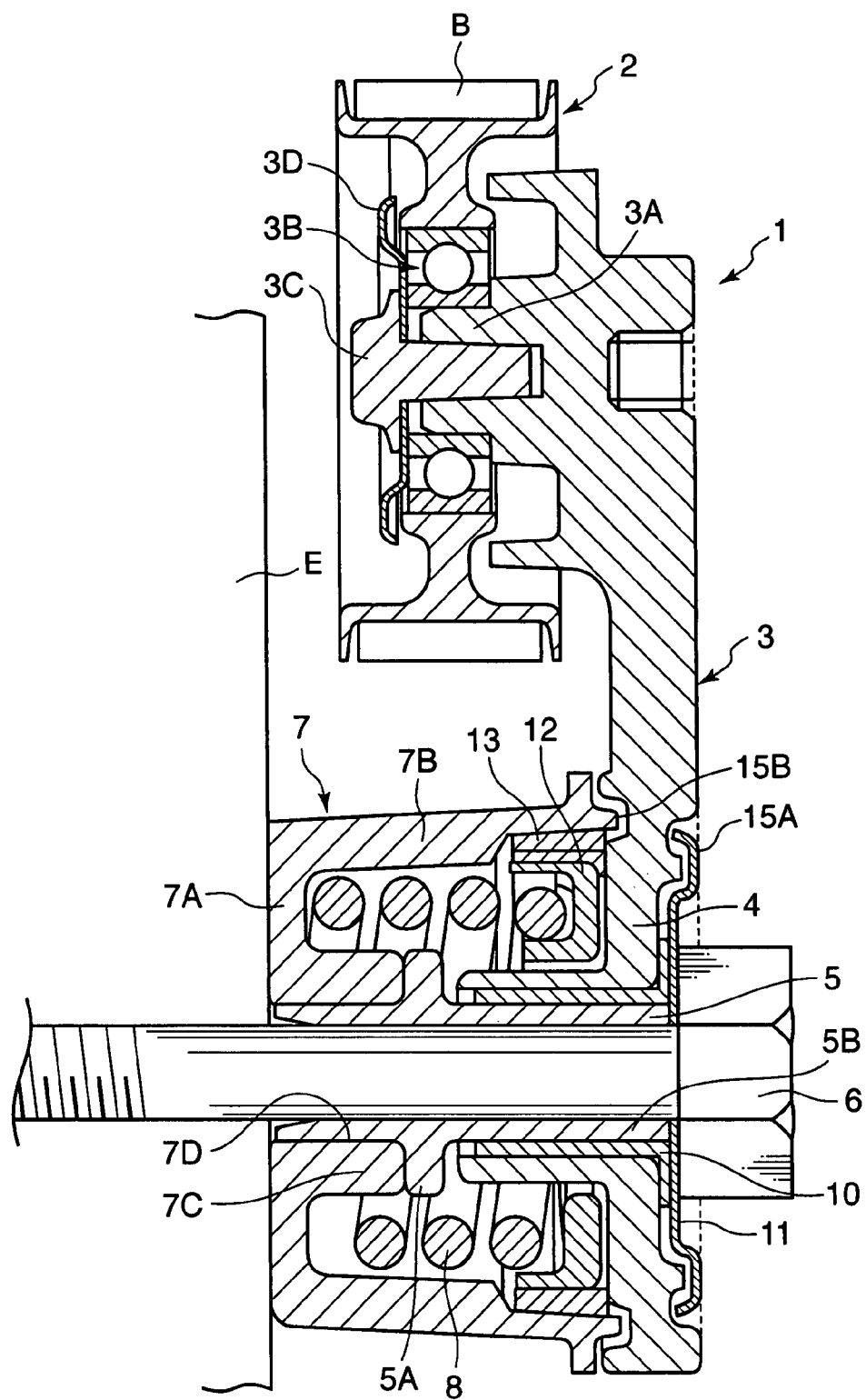
FIG. 1 is a sectional view of essential parts of a tensioner according to this invention.

Referring to FIG. 1 of the drawings, a tensioner 1 which exerts a tensile force on a belt B serving as an endless torque transmitting member comprises a tension pulley 2 around which the belt B is looped, an arm 3 supporting the tension pulley 2 so as to be free to rotate, and a base member 7 supporting a boss 4 of the arm 3 on a pivot shaft 5 so as to be free to swing about the pivot shaft 5. The base member 7 is fixed to a fixed member E such as an engine cylinder block by a bolt 6. A torsion coil spring 8 is interposed between the base member 7 and the arm 3 so as to exert a rotational torque on the arm 3 in a predetermined rotational direction with respect to the base member 7. The predetermined rotational direction corresponds to a direction which increases the tensile stress in the belt B.

The tension pulley 2 is supported on an axis 3A at the tip of the arm 3 via a ball bearing 3B so as to be free to rotate. The ball bearing 3B comprises an inner wheel fitted onto the outer circumferential surface of the axis 3A and an outer wheel fitted on the inner circumferential surface of the tension pulley 2. The inner wheel is gripped between a circular retaining plate 3D and the arm 3. The retaining plate 3D is fixed to the arm 3 by a bolt 3C which screws into the tip of the axis 3A. The retaining plate 3D covers the outer wheel without contacting the outer wheel so as not to prevent the outer wheel from rotating.

The base member 7 is a drum-shaped member having a through-hole 7D in the central portion. The base member 7 comprises a bottom portion 7A which is in contact with the fixed member E, an outer cylindrical portion 7B extending from the outer circumference of the bottom portion 7A towards the arm 3, and a boss 7C projecting from the bottom portion 7A towards the arm 3 and delimiting the through-hole 7D. A cylindrical pivot shaft 5 is press fitted into the through-hole 7D. The base member 7 in which the bottom portion 7A, the outer cylindrical portion 7B, and the boss 7C are integrally formed is constructed from cast metal obtained through die-casting of an aluminum alloy.

Figure 2:
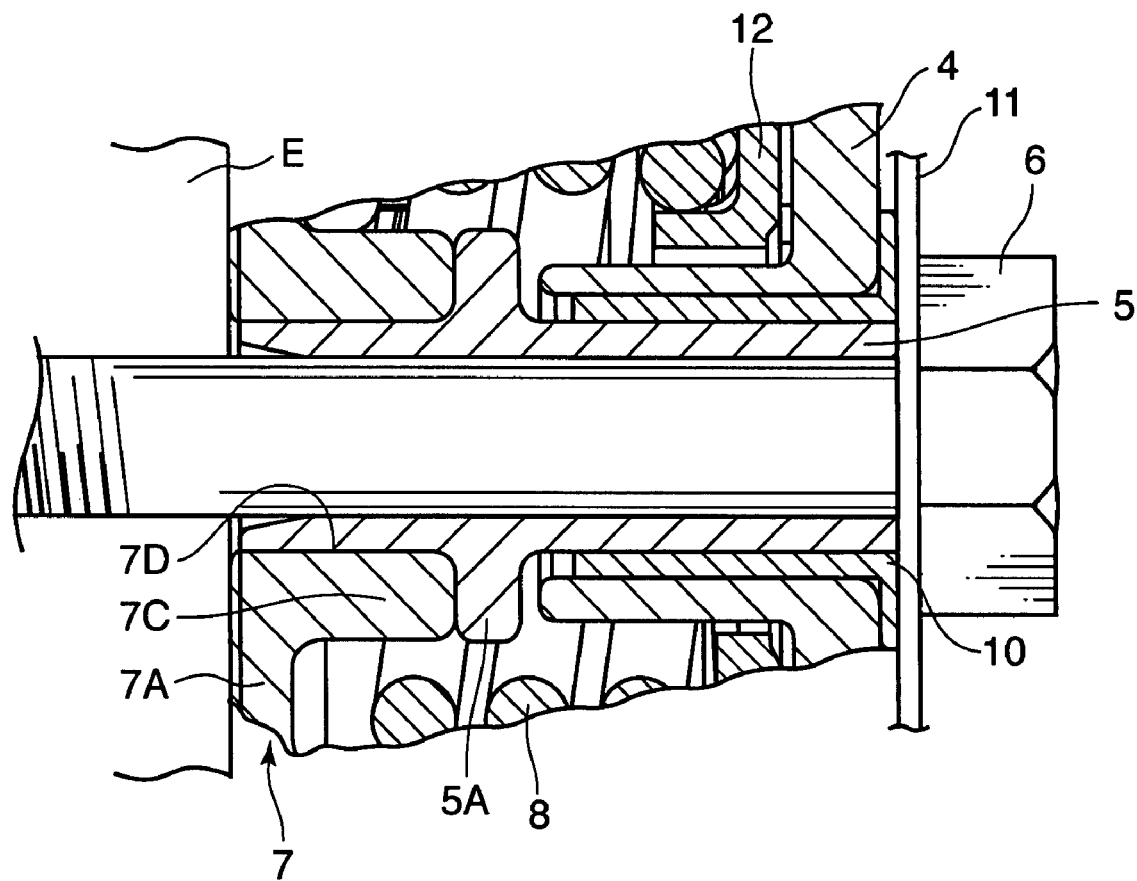
FIG. 2 is an enlarged sectional view of a pivot shaft and related structures according to this invention.

Referring to FIG. 2, the pivot shaft 5 is a cylindrical member constructed from a steel material which is known to have a high structural strength, and has a through-hole 5B extending in an axial direction in the central portion thereof. A flange 5A is formed on the outer circumference of the pivot shaft 5 so as to contact a tip of the boss 7C. A bushing 10 is fitted on the outer circumferential surface of the pivot shaft 5 in a position opposite to the boss 7C with respect to the flange 5A.

The boss 4 formed on the base of the arm 3 is fitted onto the outer circumferential surface of the bushing 10 so as to be free to rotate.

The tip of the pivot shaft 5 press fitted into the through-hole 7D of the base member 7 is preferably located in a position slightly retracted from the fixed member E so as not to be in contact with the fixed member E. This arrangement is materialized by setting the distance between the flange 5A and the tip of the pivot shaft 5 press fitted into the through-hole 7D in advance to be shorter than the distance between the tip of boss 7C and the fixed member E.

The bushing 10 comprises a flange portion which is in contact with a bottom face of the boss 4. A bolt 6 penetrates the through-hole 5B of the pivot shaft 5. The bolt 6 passes through the through-hole 5B and is screwed into a screw hole formed in the fixed member E. A circular metal plate 11 is gripped between the flange portion of the bushing 10 and the bolt head of the bolt 6. The plate 11 is constructed in a disk-shape which has a greater diameter than the flange portion of the bushing 10 and covers a part of a side face of the arm 3 in the vicinity of the rotational center. In other words, the plate 11 covers the bottom face of the boss 4. The plate 11 and the side face of the arm 3 are maintained in a non-contact state with a clearance corresponding to the thickness of the flange portion of the bushing 10. A labyrinth seal 15A is provided between the plate 11 and the side face of the arm 3.

According to the structure described above, an axial force acts on the pivot shaft when tightening the bolt 6 screwed into the fixed member E. This axial force is transmitted from the flange 5A of the pivot shaft 5 to the base member 7, and pushes the bottom portion 7A of the base member 7 against the outer surface of the fixed member E with a high contact pressure. A load acting on the base member 7 in a rotational direction is supported by a frictional resistance which is generated in the contact surface between the bottom portion 7A and the fixed member E.

Referring again to FIG. 1, a labyrinth seal 15B is provided between the tip of the outer cylindrical portion 7B of the base member 7 and the arm 3. As a result, the labyrinth seals 15A and 15B are provided between a side face of the arm 3 and the plate 11, and between another side face of the arm 3 and the tip of the outer cylindrical portion 7B, respectively. According to this arrangement of the labyrinth seals 15A and 15B, a space having an annular cross-section, which is isolated from the outside with respect to lubricant leakage and infiltration of moisture and dust, is formed by the base member 7, the pivot shaft 5, the bushing 10, and the arm 3.

The torsion coil spring 8 is enclosed in this space. An end of the torsion coil spring 8 is supported by the bottom portion 7A or the outer cylindrical portion 7B near the bottom portion 7A. Another end of the torsion coil spring 8 is supported by a spring seat 12 fixed to the boss 4 of the arm 3. A friction ring 13 is interposed between the outer circumference of the spring seat 12 and the outer cylindrical portion 7B of the base member 7. The friction ring 13 allows relative rotation between the arm 3 and the base member 7 under a predetermined resistance, thereby acting as a damper damping the rotational movement of the arm 3.

The torsion coil spring 8 is disposed between the base member 7 and the arm 3 under a torsional and compressive pre-stress.

Due to a restoring force against the torsional pre-stress, the torsion coil spring 8 always exerts a rotational force on the arm 3 with respect to the base member 7 in a predetermined direction. This direction corresponds to a direction which increases the tensile stress in the belt B. As a result, an appropriate tensile force is exerted on the belt B looped around the tension pulley 2 on the tip of the arm 3.

In this tensioner 1, the reaction force of the tensile force that the tension pulley 2 exerts on the belt B is supported by the frictional resistance against the relative rotation between the bottom portion 7A of the base member 7 and the fixed member E.

Figure 3:
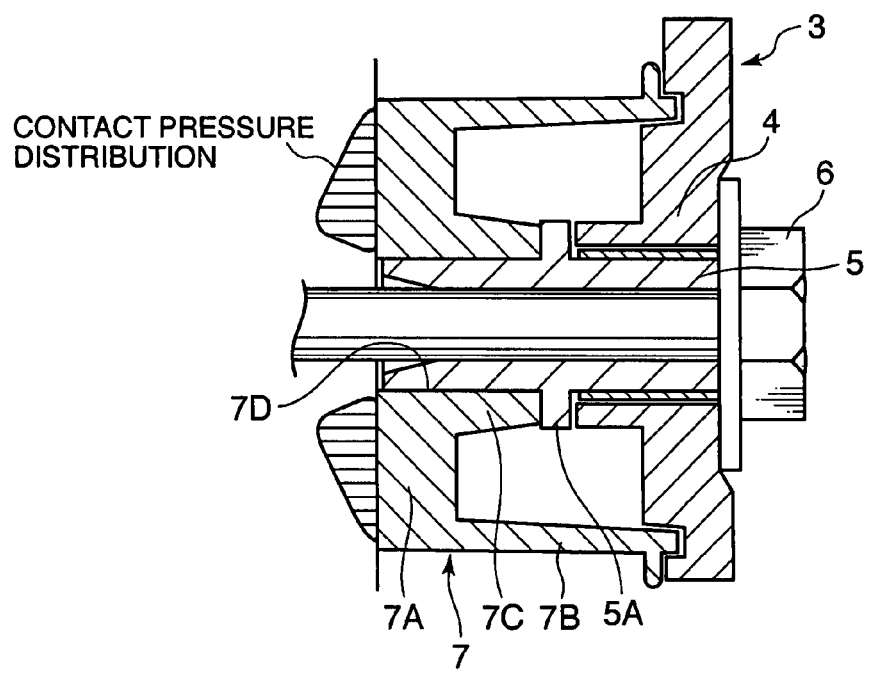
FIG. 3 is a sectional view of essential parts of the tensioner describing a contact pressure distribution between a base member and a fixed member, according to this invention.
Figure 4:
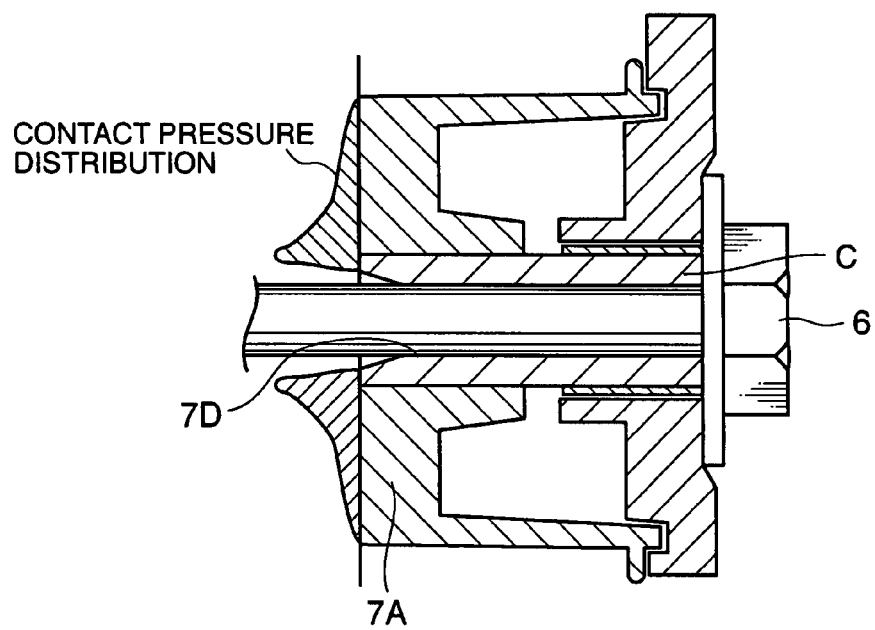
FIG. 4 is similar to FIG. 3, but shows a comparative example not applying this invention.

Referring to FIGS. 3 and 4, an advantage of maintaining the tip of the pivot shaft 5 in a non-contact state with fixed member E will be described. In the tensioner 1 according to this embodiment, the tip of the pivot shaft 5 is retracted from the fixed member E as shown in FIG. 3. The binding force of the bolt 6 is transmitted from the flange 5A of the pivot shaft 5 to the bottom portion 7A of the base member 7, and presses the bottom portion 7A against the fixed member E. As shown in the figure, the contact pressure acting on the fixed member E takes a peak value in a region displaced outwardly from the through-hole 7D to some extent and then decreases gradually towards the outer circumference of the bottom portion 7A.

FIG. 4 shows a prior art tensioner in which the pivot shaft 5 is replaced by a collar C. The collar C is constructed from a steel material as in the case of the pivot shaft 5. The collar C is however not provided with a flange such as the flange 5A of the pivot shaft 5. The collar C is press fitted into the through-hole of the base member 7 and the tip of the collar C is in contact with the fixed member E. The axial force generated by tightening the bolt onto the fixed member E acts on the fixed member E via the collar C, and large contact pressure is generated between the tip of the collar C and the fixed member E. Although a part of the axial force is transmitted to the base member 7 via the press fitting portion of the collar C, the contact pressure acting on the fixed member E takes a peak value in a region that is in contact with the tip of the collar C and decreases rapidly toward the outer circumference of the bottom portion 7A.

In the tensioner shown in FIG. 4, the region of the fixed member E which receives the high contact pressure is limited to the region in the vicinity of the central portion of the contact part. In this contact pressure distribution, a sufficient frictional resistance cannot be obtained against the rotational torque that the torsion coil spring 8 exerts on the base member 7.

In the tensioner 1 according to this embodiment, the contact pressure takes a peak value in a region displaced more outwardly from the central portion of the contact surface and decreases more gradually from the peak value towards the outer circumference of the base member 7 than in the case of the tensioner in FIG. 4. With respect to the rotational torque that the torsion coil spring 8 exerts on the base member, a high frictional resistance is obtained throughout the entire contact surface between the bottom portion 7A and the fixed member E This difference in the distribution of the contact pressure occurs because the tensioner 1 according to this invention causes the flange 5A formed in the pivot shaft 5 to contact the boss 7C of the base member 7 while maintaining the tip of pivot shaft 5 and the fixed member E in a non-contact state.

Moreover, in the tensioner 1, the axial force generated by tightening the bolt 6 onto fixed member E is transmitted from the flange 5A to the bottom portion 7A, and hence the positions of the arm 3 and the tension pulley 2 along the rotation axis are not affected by the tightening force of the bolt 6. A deviation in the alignment of the belt 6 with respect to the tension pulley 2 is therefore unlikely to occur.

Furthermore, in this tensioner 1, only the pivot shaft 5 including the flange 5A is required to be constituted by a high-strength material such as a steel material. Therefore, the manufacturing cost can be decreased and the weight of the tensioner can be decreased in comparison with a case where the entire base member is constructed from a steel material. The tensioner 1 according to this invention can be fixed to the fixed member E with one bolt 6, and hence fitting the tensioner 1 onto the fixed member E is easy.

The contents of Tokugan 2006-149476, with a filing date of Apr. 4, 2006 in Japan, are hereby incorporated by reference.

Although the invention has been described above with reference to a certain embodiment of the invention, the invention is not limited to the embodiment described above. Modifications and variations of the embodiment described above will occur to those skilled in the art, within the scope of the claims.

For example, in the embodiment described above, the axial force that the bolt 6 exerts on the pivot shaft 5 is transmitted to the bottom portion 7A of the base member 7 via the flange 5A. However, the following constructions can be applied instead of using the flange 5A.

Specifically, the through-hole 7D of the boss 7C is formed into a conical shape which increases in diameter towards the arm 3, or in other words towards the right hand side in FIG. 1. The pivot shaft 5 fitted into the through-hole 7D is formed into a similar conical shape. The axial force acting on the pivot shaft 5 can then be transmitted to the bottom portion 7A without forming the flange 5A.

Alternatively, forming the base member 7 with the bottom portion 7A and the outer cylindrical portion 7B without the boss 7C, and providing a flange on the pivot shaft 5 which comes into contact with the inner circumferential surface of the outer cylindrical portion 7B or the rear face of the bottom portion 7A, may also enable transmission of the axial force acting on the pivot shaft 5 to the bottom portion 7A.

The pivot shaft 5 may be constructed from a material other than a steel material as long as it is superior in strength to the material for the base member 7. Instead of constructing the base member 7 from a cast metal obtained through die-casting of an aluminum alloy, the base member 7 may be constructed from another light metal material or resin material.

In the embodiment described above, the tensioner 1 applies a tensile force to an endless belt B, but the tensioner according to this invention can be applied for applying a tensile force to any other kind of endless torque transmitting member including a chain.

The embodiments of this invention in which an exclusive property or privilege is claimed are defined as follows:

What is claimed is:

1. A tensioner supported on a fixed member for applying a tensile force to an endless torque transmitting member, comprising:
    a tension pulley engaged with the endless torque transmitting member;
    an arm supporting the tension pulley;
    a base member interposed between the arm and the fixed member;
    a pivot shaft penetrating the arm and inserted into the base member so as to allow the arm to rotate with respect to the base member;
    a torsion coil spring interposed between the base member and the arm so as to exert a rotational torque on the arm;
    a bolt penetrating the pivot shaft and screwed into the fixed member, the bolt having a bolt head engaged with a tip of the pivot shaft; and
    a relative displacement preventing mechanism which prevents a relative displacement between the base member and the pivot shaft when an axial force is transmitted from the bolt to the base member via the pivot shaft, wherein
    the relative displacement preventing mechanism comprises a large diameter part formed in the pivot shaft, which presses the base member against the fixed member in response to a tightening force of the bolt transmitted to the pivot shaft,
    the base member comprises a boss penetrated by the bolt,
    the large diameter part comprises a flange formed on the outer circumferential surface of the pivot shaft so as to be in contact with the boss from a direction along an axis of the pivot shaft,
    the boss has a through-hole penetrated by the bolt,
    the pivot shaft is fitted into the through-hole in a state where a tip of the pivot shaft does not contact the fixed member, and
    a contact portion between the base member and the pivot shaft overlaps a contact portion between the base member and the fixed member in an axial direction of the pivot shaft.

2. The tensioner as defined in claim 1, wherein a distance between the flange and a penetrating tip of the pivot shaft in the through-hole is set to be shorter than a distance between a tip of the boss and the fixed member.

3. The tensioner as defined in claim 1, wherein the base member comprises a bottom portion having a contact face with the fixed member, the boss projects from the bottom portion towards the arm, and an outer cylindrical portion projects from an outer circumference of the bottom portion towards the arm.

4. A tensioner supported on a fixed member for applying a tensile force to an endless torque transmitting member, comprising:
    a tension pulley engaged with the endless torque transmitting member;
    an arm supporting the tension pulley;
    a base member interposed between the arm and the fixed member;
    a pivot shaft penetrating the arm and inserted into the base member so as to allow the arm to rotate with respect to the base member;
    a torsion coil spring interposed between the base member and the arm so as to exert a rotational torque on the arm;
    a bolt penetrating the pivot shaft and screwed into the fixed member, the bolt having a bolt head engaged with a tip of the pivot shaft; and
    a relative displacement preventing mechanism which prevents a relative displacement between the base member and the pivot shaft when an axial force is transmitted from the bolt to the base member via the pivot shaft;

wherein
    the relative displacement preventing mechanism comprises a large diameter part formed in the pivot shaft, which presses the base member against the fixed member in response to a tightening force of the bolt transmitted to the pivot shaft;
    the base member comprises a boss penetrated by the bolt, and the large diameter part comprises a flange formed on the outer circumferential surface of the pivot shaft so as to be in contact with the boss from a direction along an axis of the pivot shaft;
    the boss has a through hole penetrated by the bolt, and the pivot shaft is fitted into the through-hole in a state where a tip of the pivot shaft does not contact the fixed member;
    the base member comprises a bottom portion having a contact face with the fixed member, the boss projects from the bottom portion towards the arm, and an outer cylindrical portion projects from an outer circumference of the bottom portion towards the arm; and the tensioner further comprises a plate gripped between the bolt head of the bolt and the pivot shaft to cover a side face of the arm, a labyrinth seal provided between the plate and the side face of the arm, and a labyrinth seal provided between a tip of the outer cylindrical portion and another side face of the arm.

5. The tensioner as defined in claim 3, wherein the torsion coil spring is disposed in the outer cylindrical portion.

6. The tensioner as defined in claim 1, wherein the base member is formed from a light metal and the pivot shaft is formed from a ferrous material.

* * * * *